United States Patent [19]

Reschke

[11] 4,361,456
[45] Nov. 30, 1982

[54] PROCESS AND APPARATUS FOR THE CONTINUOUS MANUFACTURE OF A CONVEYOR BELT

[75] Inventor: Reinhold Reschke, Hanover, Fed. Rep. of Germany

[73] Assignee: Hermann Berstorff Maschinenbau GmbH, Hanover, Fed. Rep. of Germany

[21] Appl. No.: 262,070
[22] PCT Filed: Sep. 11, 1979
[86] PCT No.: PCT/DE79/00109
§ 371 Date: Jun. 16, 1980
§ 102(e) Date: Jun. 16, 1980
[87] PCT Pub. No.: WO80/00815
PCT Pub. Date: May 1, 1980

[30] Foreign Application Priority Data

Oct. 19, 1978 [DE] Fed. Rep. of Germany ....... 2845476

[51] Int. Cl.³ .................... B32B 31/08; B29H 7/00
[52] U.S. Cl. .................... 156/179; 156/137; 156/244.12; 156/322; 156/324; 156/437; 156/500; 156/555; 425/373
[58] Field of Search ............... 156/179, 176, 137, 324, 156/322, 436, 437, 555, 500, 244.12; 264/263, 265; 425/373, 28 B

[56] References Cited

U.S. PATENT DOCUMENTS 1,488,343 3/1924 Hoffman .................... 156/128 R
2,296,372 9/1942 Smith et al. .................... 156/137
3,556,892 1/1971 Hilliard, Jr. .................... 156/137
3,711,348 1/1973 Reschke .................... 156/137

OTHER PUBLICATIONS

Becker, Electron Beam Irradiation of Tire Components, RPN Technical Notebook, Nov. 19, 1977, p. 16.

Primary Examiner—Michael W. Ball
Attorney, Agent, or Firm—Schwartz, Jeffery, Schwaab, Mack, Blumenthal & Koch

[57] ABSTRACT

In a process for the continuous manufacture of a conveyor belt with rubber covering layers and with a reinforcing insert of longitudinal wire ropes, the wire ropes are maintained in tension and covered with an upper and lower covering layer of rubber. The raw belt constructed in this manner is then vulcanized by means of exposure to pressure and heat in a rotating installation. The innermost rubber cover layer in the radial direction is scorched prior to its placement on the outer cover layer and the longitudinal steel wires.

An apparatus for the continuous manufacture of a conveyor belt with cover layers of rubber and with a reinforcing insert of longitudinal steel ropes has an extruder-calender arrangement (2, 4 and 3, 5, respectively) each for the production of the lower and upper cover layer (11, 12). At least one doubling installation (15, 17; 22, 23) is provided for the combining of the cover layers (11, 12). Between the extruder-calender (2, 4) producing the cover layer (11) resting on the press drum (16) during the finish vulcanizing process, and the doubling station (22, 23), a heating device (24, 26) is provided for the heating of the cover layer (11).

9 Claims, 1 Drawing Figure

U.S. Patent
Nov. 30, 1982
4,361,456
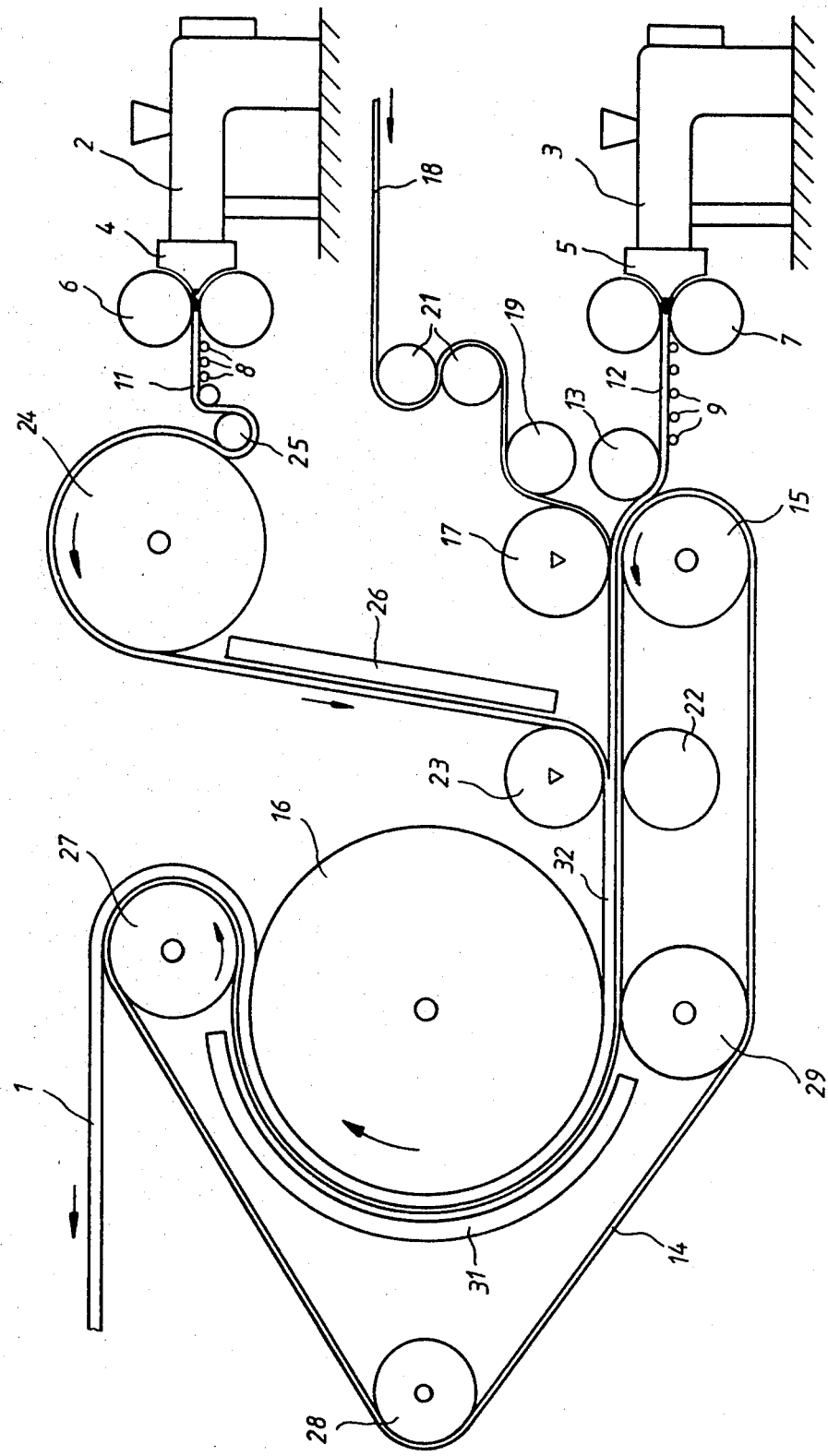

PROCESS AND APPARATUS FOR THE CONTINUOUS MANUFACTURE OF A CONVEYOR BELT

TECHNICAL FIELD

The invention concerns the continuous manufacture of cable reinforced conveyor belts. In the process, rubber covering layers are placed onto a band of cables and exposed to a pressing and vulcanizing process.

STATE OF THE ART

Cable-reinforced conveyor belts are usually manufactured in two process steps. First, the raw belts are fabricated by covering the highly stressed cables with cover layers. The raw belts prepared in this manner are wound onto a storage roll. For the purpose of vulcanizing the conveyor belts, the raw belts are pressed and vulcanized in a second process step, either in a plate press in sections or continuously in a rotating installation. Vulcanizing in a rotating installation has the advantage of a fully continuous mode of operation (see the journal Gummi, Asbest, Kunststoffe 5/1978, pages 328 to 336).

Recently, specialists in the art have been making attempts to develop advanced production facilities, wherein conveyor belts might be fabricated and vulcanized in a single cycle without the intermediate storage of raw belts. Installations of this type always operate with a platen press as the vulcanising press because rotating devices are not applicable for the reason that the steel wires under stress are pulling into the cover layer that is innermost in the radial direction, against the central drum of the press. The accurate center position of the reinforcing insert thus cannot be insured. This is also true for a further installation for the continuous manufacture of conveyor belts wherein initially in a large extruder a rubber hose with the wall thickness of the conveyor belt and a circumference corresponding to the width of the conveyor belt is produced, while the cables are being embedded simultaneously around the hose. Subsequently, the hose is cut between two cables, flattened out and fed continously, without interruption into a rotating installation (DE-OS No. 21 29 439). Here again, the steel wires, which are necessarily under stress, are pulling into the cover layer inside in the radial direction, by virtue of the resultant force.

It has therefore been proposed (DE-AS No. 19 31 972), to compensate this evasion of the steel wires by means of a suitable design of the cover layers. The cover layer that is innermost in the radial direction is to be made thicker than the outercover layer in the radial direction, so that the steel wires will be in an approximately correct position with respect to the surface of the conveyor belt. However, this proposal does not yield an accurate, defined position of the steel wires in the finished conveyor belt. Furthermore, the differential structure of the conveyor belt may be a disadvantage under the high operating stresses.

OBJECT

It is the object of the invention to provide a process for the uninterrupted fabrication and vulcanization of conveyor belts reinforced with steel wire, wherein a rotating vulcanizing press is used without the above-described disadvantages regarding the position of the steel wires.

DISCLOSURE OF THE INVENTION

The object is attained according to the invention in that the cover layer innermost in the radial direction is scorched prior to the placing thereon of the outer covering layer and the steel wires, and in that the raw belt is pressed and vulcanized after it has been placed in the rotating installation.

The cover layer placed on the center press drum of the rotating installation of the raw belt thus offers higher resistance to the steel wires under stress. Depending on the degree of scorching and the properties of the rubber mixture, the steel wires may remain in a defined position with respect to the surfaces of the belt.

The invention makes it possible to use rotating presses as the vulcanizing presses in an installation for the uninterrupted fabrication and vulcanizing of conveyor belts.

The invention also concerns an apparatus for the continuous manufacture of a conveyor belt with a continuous rotating installation. The apparatus is characterized by that an extruding-calendering arrangement is provided for both the production of the lower and the upper cover layer, that at least one doubler device is present for the combination of the cover layers and the layer of steel wire, and that a heating device to heat the cover is provided between the extruder-calender producing the cover layer resting on the press drum during the scorching process and the doubling station.

Further advantageous embodiments of the apparatus with a continuous rotating installation for the vulcanizing of the built-up raw belt will be apparent as the following description proceeds in particular reference to the application drawing.

DESCRIPTION OF THE FIGURE

The FIGURE of the drawing comprises a single partially diagramatic side elevational view of the apparatus according to the invention.

DETAILED DESCRIPTION OF THE PREFERRED EMBODIMENT

The apparatus for the uninterrupted and continuous manufacture of a conveyor belt 1 reinforced with steel wire has two extruders 2 and 3, both equipped with wide slit nozzles 4, 5. The wide slit nozzles 4 and 5 are followed by two-roll calenders 6, 7. Each two-roll calender 6 and 7, respectively, is followed in turn by a conveying roll segment 8, 9 for the rubber sheets leaving the two-roll calenders 6, 7. The lower rubber cover layer 12 is placed by a pressure roll 13 under slight pressure onto an endless steel back pressure belt 14, which at this point has just been guided back by means of a tail sheave 15 to a central pressure drum 16. Between the tail sheave 15 and the press drum 16 the endless steel back pressure belt 14 forms a horizontal bearing surface.

The tail sheave 15 is associated with a pressure loaded double roll 17 upon which a set of parallel steel wires 18, coming from a grooved roll 19, is running. The steel wires 18, coming from a spool rack (not shown), are stressed by a roll tensioning device 21. Between the first doubling station 15, 17 and the press drum 16 is arranged a second doubling station comprising two rolls 22 and 23. The second, upper rubber cover layer 11 runs onto the circumference of the upper, pressure loaded doubling roll 23. The cover layer 11, produced by the upper extruder-calender 2, 4 is guided over a heating drum 24, after passing over a pressure roll 25. The angle of contact in the embodiment illustrated is approximately 200°. After leaving the heating drum 24, the cover layer 11 is further heated by a radiating heater body 26. It may be appropriate in the case of rubber mixtures tending to be porous to provide the heater drum 24 with a pressure hoop partially surrounding said heater drum 24.

The central pressure drum 16 is partially surrounded by the endless steel belt 14 guided by the tail sheaves 27, 28, 29 and 15, while forming a pressure segment. The reverse side of the endless steel belt 14 is heated by a curved radiation heating device 31 in the area wherein it surrounds the pressure drum 16.

BEST MODE OF THE EMBODIMENT OF THE INVENTION

The two rubber cover layers 11, 12 are produced by the extruder-calender 2, 4 and 3,5. The lower cover layer 12 is placed by way of the conveying roll segment 9 and by means of the pressure roll 13 onto the endless steel belt 14 and guided to the first doubling station 15, 17, where steel wires 18, tensioned and held parallel by means of the guide pulley 19, are pressed into the lower cover layer 12. The cover layer 12 with the impressed steel wires 18, is moved to the second doubling station 22, 23 on the endless steel belt 14. In this second doubling station 23, 23 the upper cover layer is applied. The upper cover layer 11 is guided prior to this over the circumference of the heating drum 24 and past the radiating heater body 26. The surface of the cover layer 11 facing the heating drum 24 and the radiating heater body 26 is exposed to controlled scorching by means of this heating. The raw belt 32 constructed in this manner is directed into the rotating press formed by the drum 16 and endless belt 14. In the compression segment formed by the portion of the endless steel belt 14 surrounding the drum 16, the raw belt 32 is compressed and vulcanized. Heat is supplied by means of heating the press drum 16, with the reverse side of the belt being heated by means of the curved radiating heater body 31 positioned on the return side of the steel belt 14. After leaving the compression segment, the vulcanized conveyor belt 1 is separated from the return leg of the endless steel belt 14 and transported to further processing installations.

The steel wires 18, stressed in tension, cannot pull into cover layer 11, that is, the inner layer when viewed in the radial direction in the course of their passing through the compression segment, by virtue of the scorched and thus harder surface of the upper cover layer 11. The shifting of the steel wires 18 is no longer possible. With knowledge of the mixture of rubber used, the position of the steel wires 18 in the conveyor belt 1 can be determined with accuracy. The controlled scorching of the cover layer 11 enables this layer to offer a predetermined resistance to the penetration of steel wires 18, depending on the mixture of rubber and the degree of scorching, during their passage through the compression path around the press drum 16.

It is possible within the scope of the process described hereinabove to run adhesion promoting layers between the cover layers. Such adhesion promoting layers are known in themselves. It is also possible to embed the layer of steel wires in a thin, adhesive layer of rubber prior to the first doubling station.

INDUSTRIAL APPLICABILITY

By means of the process and apparatus according to the invention, cable reinforced conveyor belts may be produced continuously. For the first time, it is possible to insure the accurate central position of the parallel cable reinforcements in continuous production. Conveyor belts made by the process of the invention or on an apparatus according to the invention are capable of long life and operating safety in spite of extreme stresses in use. The production of cable reinforced conveyor belts of high quality is thus more economical.

I claim:

1. A process for the continuous manufacture of conveyor belts with covering layers of rubber and a reinforcing insert of longitudinal wire ropes, comprising the steps of:
    (a) tensioning and holding parallel said wire ropes;
    (b) pressing in a first station said tensioned wire ropes into a lower cover layer;
    (c) applying in a second station spaced from said first station an upper cover layer over said wire ropes, said upper cover layer, prior to said second station, passing through heating means to effect controlled scorching and thus surface hardening of said upper cover layer, and thereafter, in a continuous manner;
    (d) passing said raw belt comprising said cover layers and said wire ropes through a compressing and vulcanizing zone to form the completed belt, with said upper cover layer being the radially inner layer when passing through said zone.

2. The process of claim 1 wherein said controlled scorching of said upper cover layer is effected by first passing said upper layer over a substantial portion of the circumference of a rotating heating drum and thereafter passing said layer contiguous to an elongated radiating heater.

3. The process of claim 1 wherein said step of compressing and vulcanizing is effected by passing said raw belt between a rotating heating drum and an endless belt, the radially outer side of said raw belt being heated by a curved radiating heater disposed radially outwardly adjacent said endless belt and traversing a substantial portion of the circumference of said heating drum.

4. Apparatus for the continuous manufacture of conveyor belts having covering layers of rubber with a reinforcement insert of longitudinal wire ropes, comprising:
    (a) means for extruding separately first and second cover layers;
    (b) means for tensioning and holding parallel said wire ropes;
    (c) a first station at which said tensioned wire ropes are pressed into said first cover layer;
    (d) means for heating and effecting controlled scorching and thus hardening of said second layer;
    (e) a second station spaced from said first station for applying said second cover layer to said wire ropes and said first cover layer to form a raw belt, and
    (f) vulcanizing means through which said raw belt passes for compressing and vulcanizing said belt, said scorched second layer being the radially inner layer when said belt passes through said vulcanizing means.

5. The apparatus of claim 4 further including an extruder-calender for simultaneously forming each of said first and second cover layers, and a first doubling station comprising a roll superimposed over a sheave and between which said first cover layer and said wire ropes pass and are compressed.

6. The apparatus of claim 5 further including a second doubling station positioned between said vulcanizing means and said first doubling station, said second doubling station comprising first and second superimposed rolls between which pass said first and second cover layers and said wire ropes positioned therebetween, said raw belt being formed at said second doubling station.

7. The apparatus of claim 5 wherein said vulcanizing means comprise a rotatable heating drum and a rotating endless belt, with said raw belt being carried and compressed between said endless belt and said heating drum, and further comprising a curved radiating heater disposed radially outwardly of and contiguous to said endless belt.

8. The apparatus of claim 4 wherein said means for heating and effecting controlled scorching of said second cover layer comprises a second rotating drum around which said second cover layer passes, and an elongated radiating heater along which said second cover layer passes.

9. The apparatus of claim 5 wherein said sheave is positioned relative to rotatable heating drum so that an endless belt positioned over said sheave and passing around a portion of said drum has a horizontal bearing surface at the inlet side of said drum.

* * * * *